US011044797B2

(12) United States Patent
Gu et al.

(10) Patent No.: US 11,044,797 B2
(45) Date of Patent: Jun. 22, 2021

(54) METHOD OF AND DEVICE FOR COMMISSIONING A LIGHTING SYSTEM

(71) Applicant: SIGNIFY HOLDING B.V., Eindhoven (NL)

(72) Inventors: Qun Gu, Eindhoven (NL); Gong Ming Wei, Eindhoven (NL); Lei Feng, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/708,811

(22) Filed: Dec. 10, 2019

(65) Prior Publication Data

US 2020/0205272 A1    Jun. 25, 2020

(30) Foreign Application Priority Data

Dec. 21, 2018 (WO) ................ PCT/CN2018/122851
Feb. 22, 2019 (EP) .................................... 19158832

(51) Int. Cl.
*H05B 47/19* (2020.01)
*H05B 47/155* (2020.01)
*H05B 47/105* (2020.01)

(52) U.S. Cl.
CPC ........... *H05B 47/19* (2020.01); *H05B 47/105* (2020.01); *H05B 47/155* (2020.01)

(58) Field of Classification Search
CPC .... H05B 47/19; H05B 47/105; H05B 47/155; H04W 64/00; H04W 64/003
See application file for complete search history.

(56) References Cited

U.S. PATENT DOCUMENTS 8,825,078 B1   9/2014   Mishra
9,121,931 B2   9/2015   Xu et al.
(Continued)

FOREIGN PATENT DOCUMENTS

| WO | 2008129488 A2 | 10/2008 | |
|---|---|---|---|
| WO | WO-2017045885 A1 * | 3/2017 | ......... H04L 41/0893 |
| WO | 2018024528 A1 | 2/2018 | |

OTHER PUBLICATIONS

Minimum Average Distance Triangulations Dec. 8, 2011 (https://www.groundai.com/project/minimum-average-distance-triangulations/3 (Year: 2011).*

(Continued)

*Primary Examiner* — Henry Luong

(57) ABSTRACT

Method of and device for commissioning a lighting system including a plurality of lighting fixtures positioned at a plurality of physical locations. The lighting fixtures are mapped to a respective physical location using signals generated by the lighting fixtures and received at multiple detection locations by at least one or more detecting devices integrated with or external to the lighting fixtures. In particular, the method applies a probability-based algorithm to distances from the physical locations to multiple detection locations, and RSSI levels of signals received at the detection locations to determine a probability of having a respective lighting fixture located at a respective physical location. The method provides for commissioning the lighting system without traversing all the physical locations of lighting fixtures, resulting in a reduction of both work load for conducting the commissioning of the lighting system and processing power required for the commissioning.

16 Claims, 7 Drawing Sheets

(56) References Cited

U.S. PATENT DOCUMENTS

| | | |
|---|---|---|
| 9,208,680 B2 | 12/2015 | Norlén et al. |
| 9,335,399 B2 | 5/2016 | Rudland et al. |
| 2018/0270933 A1 | 9/2018 | Hu et al. |
| 2020/0084863 A1* | 3/2020 | Taylor .................... H04W 4/33 |
| 2020/0279482 A1* | 9/2020 | Berry .................... G08G 1/142 |

OTHER PUBLICATIONS

P. Lin, "Determining the Relative Position of a device in a Wireless Network with Minimal Effort", Master Thesis, Eindhoven University of Technology, Aug. 2016, pp. 1-79.

* cited by examiner though, a relative spatial arrangement of a group of devices is to be determined, for example based on a known floor plan of the group of devices, which is not available from the prior art.

There is a need for a method and a device capable of commissioning a lighting system in a time and cost efficient manner.

SUMMARY

The above mentioned and other objects are achieved, in a first aspect of the present disclosure, by a method of commissioning a lighting system comprising a plurality of lighting fixtures positioned at a plurality of physical locations, each lighting fixture having at least one signal generating device for generating a Radio Frequency, RF, output signal comprising a unique identifier identifying the lighting fixture.

The method is performed by a processing device and comprises the steps of:

constructing a first dataset comprising distances to the physical locations from a detection location selected for receiving RF output signals produced by the lighting fixtures, constructing a second dataset comprising, RSSI, levels of RF output signals produced by the lighting fixtures, identified by their unique identifiers, and obtained by a detecting device at the detection location, obtaining a probability of a respective lighting fixture being located at a respective physical location by applying a probability-based algorithm to the first and second datasets, and commissioning the lighting system by accumulating probabilities obtained from a plurality of detection locations, a number of the detection locations is smaller than a number of physical locations.

Lighting fixtures arranged in a network of communicatively connected devices and provided with a signal generating device for generating an RF output signal, such as a wireless RF transceiver module, transmit RF signals that can be received by one or more detecting devices. It is observed that the RSSI level of an RF signal generated by a lighting fixture has a physically determined relationship with the physical distance between the lighting fixture generating the RF output signal and the detection location where the signal is detected. The present disclosure employs this observation to correlate respective lighting fixtures with their respective physical locations where a respective lighting fixture is installed or operates.

Processing, in a probability-based algorithm, the distances between a detection location and the physical locations of the lighting fixtures together with the RSSI levels produced by the RF output signals of the lighting fixtures, identified by their unique identifiers, and measured at the detection location, a probability is obtained of having a respective lighting fixture located at a respective physical location, or vice versa.

Commissioning of the lighting system is performed by accumulating probabilities obtained for each pair of lighting fixture and physical location from the above processing with measurement data obtained at multiple detections locations. A physical location with the highest probability is identified as having the lighting fixture installed thereto.

The detection locations are selected for receiving RF output signals produced by the lighting fixtures, such as in the vicinity of or overlap with the physical locations of the lighting fixtures. It is noted that, according to the present

METHOD OF AND DEVICE FOR COMMISSIONING A LIGHTING SYSTEM

TECHNICAL FIELD

The present disclosure generally relates to lighting systems and, in particular, to a method of and device for commissioning a lighting system.

BACKGROUND

A modern lighting system may include multiple lighting fixtures or luminaires, sensors, switches and other components for operating the lighting fixtures. A lighting fixture for use in such a system typically comprises a lighting module, at least one sensor, a transceiver device for data exchange, and a control module for operating the lighting fixture.

Lighting fixtures are typically installed, according to a floor plan, at different physical locations and communicatively connect to a control system or building server, via a wired or wireless network connection of the transceiver device, operating according to a network protocol. Network protocols for exchanging data by networked devices or nodes are generally available and known as ZigBee™, Bluetooth™ Bluetooth Low Energy, BLE, as well as WiFi based protocols for wireless networks, and wired bus networks such as DALI™ (Digital Addressable Lighting Interface), DSI (Digital Serial Interface), DMX (Digital Multiplex), and KNX (based systems).

The control system generally uses the physical locations of the lighting fixtures to perform advanced lighting control. For correctly controlling, by the control system, each component of the lighting system, a commissioning process is performed on the components of the lighting system after installation or upgrading of the system. Commissioning of a lighting system or network and its devices is a process in which a new system is set up according to design objectives or specifications, after installation and testing of the devices, the control equipment and communication facilities of the network, or when new device is added to an existing system or network. This commissioning process, among other, correlates the physical locations of the lighting fixtures to unique identifiers of the lighting fixtures.

The commissioning of a lighting system with multiple lighting fixtures may be conducted manually or automatically. For example, an installer may attach bar codes to a floor plan to identify the physical locations of the lighting fixtures. As another example, an auto-commissioning method may correlate lighting fixtures and their physical locations by switching on the respective lighting fixtures installed at respective physical locations one after another and measuring, at other physical locations, a signal generated by the one lighting fixture which is switched on. Both commissioning methods need to traverse a whole floor, which requires a lot of tedious efforts by a system manager and may take a lot of time and processing resources to perform the commissioning.

It is known that a spatial location of a wireless connectivity-enabled device may be derived based on signal strength measured at multiple locations. U.S. Pat. No. 8,825, 078 describes a method of finding an exact location of access points, APs, located in a room based on a Received Signal Strength Indicator, RSSI, probability matrix, calculated from RSSI signals gathered at various positions in the room using a mobile device. The method is arranged for determining the location of an AP based on measurements from two mobile devices. For commissioning of a lighting sysdisclosure, the number of detection locations can be smaller than the number of physical locations of lighting fixtures. Thus, with the present disclosure, commissioning is performed without having to traverse all the physical locations, which results in a significant reduction in both work load for a system engineer conducting the commissioning of the lighting system and the overall time needed for the commissioning.

Based on the present disclosure, a number of the detection locations is only a fraction of a number of the physical locations of the lighting fixtures. As an example, for a floor plan with one hundred or even more physical locations of lighting fixtures, the number of the detection locations may be merely one-tenth (1/10), or even one-twentieth (1/20) of the number of the physical locations.

Accordingly, the method is very efficient as commissioning is performed in less detection time and hence less costs when compared to the prior art commissioning methods as described in the background part above, for example.

In an embodiment, the detection locations are selected such that the physical locations of the lighting fixtures are substantially covered by the detection locations, which allows the commissioning to be performed with sufficient accuracy.

In accordance with an embodiment of the present disclosure, the first dataset, elements of which being the distances between each of the physical locations and a detection location, may be constructed from one of a floor plan designating the physical locations of the lighting fixtures and distance measurements. In an embodiment, the first dataset may be generated, during the commissioning, by the processing device.

It will be appreciated that for a floor plan, such as a symmetrical grid, the first dataset may be easily generated by the processing device during the commissioning process. In another embodiment, the first dataset may be obtained from another source prior to the validation, such as from manual input or from architectural drawings, from dedicated distance measurement devices, or the like.

In accordance with the present disclosure, the second dataset may be constructed by averaging RSSI levels received over a period of time. RSSI levels of the RF output signals received from each of the lighting fixtures may be collected over a period of time and averaged. This helps to obtain more accurate RSSI levels for use in the probability-based algorithm, which allows the relative arrangement of the respective lighting fixtures to be more precisely determined.

On the other hand, the RSSI levels detected by the detecting device may be pre-processed or adapted, such as normalised, prior to the second dataset is constructed. The adaption improves the commissioning, as a possible influence from different RF transmit powers of the lighting fixtures may be eliminated by the adaption or pre-processing.

In accordance with an embodiment of the present disclosure, applying the probability-based algorithm comprises the steps of:
sorting the first dataset in one of ascending and descending order and sorting the second dataset in the other of ascending and descending order, and
computing the probability by mapping the sorted first dataset and the sorted second dataset.

In consideration of the relationship between the RSSI levels generated by the lighting fixture and the distances from the lighting fixture generating the RSSI level to the detection location where the RSSI levels are detected, such as an essentially inverse relationship, it is desirable that both the first and second datasets are sorted before the probability of a lighting fixture being located at a physical location is computed, such that the sorted RSSI levels and sorted distances have comparable trends, which allows the mapping between the lighting fixtures and the physical locations to be obtained in an easier way.

In accordance with the present disclosure, the sorted first dataset and the sorted second dataset may be further split into respective contiguous intervals, before the probability of a lighting fixture being located at a physical location is computed. After splitting both the sorted first and second datasets, resulting in a split first dataset and a split second dataset, the probability of a lighting fixture being located at a physical location is computed by mapping the split first dataset and the split second dataset for respective ones of the intervals. As each interval has a limited number of elements, the processing load is reduced after the splitting, which helps to improve the efficiency of the commissioning process.

In accordance with the present disclosure, a distance index list may be constructed from the sorted and/or split first dataset and an RSSI level index list may be constructed the sorted and/or split second dataset, wherein each element of the distance index list corresponds to a physical location indicated by a distance between the physical location and the detection location, and each element of the RSSI level index list corresponds to a unique identifier of a lighting fixture. The construction of the distance and RSSI level index lists makes the mapping between the lighting fixtures and the physical locations easier as direct mapping between the distance index list and the RSSI level index list may be performed to compute the probability of a lighting fixture being located at a physical location.

In accordance with another embodiment, the step of computing the probability of a lighting fixture being located at a physical location comprises the steps of:
obtaining, for a physical location, a first subrange of the sorted first dataset,
obtaining, for the first subrange, from the sorted second dataset a second subrange of RSSI levels, and
computing the probability for lighting fixtures corresponding to the second subrange based on relative RSSI levels.

By selecting a first subrange from the sorted first dataset and then selecting a second subrange from the sorted second dataset accordingly, the time and resource needed for computing the probability of a lighting fixture being located at a physical location is substantially reduced, as mapping is performed on a limited number of distances and RSSI levels. This again helps to improve the efficiency of the commissioning.

Alternatively, the probability of a lighting fixture being located at a physical location may be computed using the following steps:
obtaining, for a lighting fixture, a first subrange of the sorted second dataset,
obtaining, for the first subrange, from the sorted first dataset a second subrange of distances, and
computing the probability for physical locations corresponding to the second subrange based on distances.

The above steps perform the mapping starting from the lighting fixtures to the physical locations, which is an alternative way of computing the probability, and also has the advantage of reducing the processing load and making the commissioning faster.

In accordance with the present disclosure, the probability-based algorithm may be applied to part of the first dataset having distances above a first threshold value and part of the second dataset having RSSI levels above a second threshold value. By truncating both datasets, elements not generating much influence to the probability are excluded from the processing. Such truncation may not have a detrimental influence on the accuracy of the overall commissioning process, while the efficiency of the same may be further increased.

In accordance with the present disclosure, the RSSI levels may be obtained by one or more mobile detecting devices. In the case that the lighting fixtures are provided with detecting capability, for example having an RF sensor, the lighting fixtures may also function as the detecting device to detect the RSSI levels. In the latter case, commissioning according to the method of the present disclosure may be completely automatically performed.

A second aspect of the present disclosure provides a device for commissioning a lighting system comprising a plurality of lighting fixtures positioned at a plurality of physical locations, each lighting fixture has at least one signal generating device for generating a Radio Frequency, RF, output signal comprising a unique identifier identifying the lighting fixture. The device comprises a processing device having a distance processing module, a Received Signal Strength Indicator, RSSI, level collecting module, a computing module and a location mapping module, which modules are operatively connected, wherein:

the distance processing module is arranged for constructing a first dataset comprising distances to the physical locations from a detection location selected for receiving RF output signals produced by said lighting fixtures, the RSSI level collecting module is arranged for constructing a second dataset comprising RSSI levels of RF output signals produced by the lighting fixtures, identified by their unique identifiers, and obtained by a detecting device at the detection location, the computing module is arranged for obtaining a probability of a lighting fixture being located at a physical location by applying a probability-based algorithm to the first and second datasets, and the location mapping module is arranged for commissioning the lighting system by accumulating probabilities obtained from a plurality of detection locations, a number of the detection locations is smaller than a number of physical locations.

Reference is made to the above elucidating description of the steps of the method according to the present disclosure. The device may be further configured such that the RSSI level collecting module receives unique identifiers of the lighting fixtures and averages RSSI levels collected, for each of the lighting fixtures, over a period of time.

The device may further comprise a report module for registering a result of commissioning in a storage device, for further use by the lighting system in performing advance lighting control.

The device may be configured such that the distance processing module comprises an interface for inputting at least one of detection or detector locations and physical locations.

A third aspect of the present disclosure provides a computer program product comprising program code means stored on a computer readable medium, the program code means arranged to perform the above commissioning method, when the program code is executed by at least one computer.

These and other aspects of the disclosure will be apparent from and elucidated with reference to the embodiment(s) described hereinafter.

DETAILED DESCRIPTION

The present disclosure is described in detail below with reference to a lighting system comprising lighting fixtures with Radio Frequency, RF, and/or optical sensors. Those skilled in the art will appreciate that the present disclosure is not limited to lighting fixtures with RF and optical sensors. Instead, lighting fixtures with other connectivity features may also be commissioned using the present disclosure.

The method and device described herein rely on a signal generating capability of lighting devices, such as by an RF transceiver module of a networked lighting fixture, and a signal receiving capability of, for example, a mobile detecting device or RF sensors or receivers that are located within the lighting fixtures.

The present disclosure further relies on the principle that strength of a signal detected at a spatial location is related to a distance between the spatial location and a source of the signal. For the purpose of the present disclosure, the term 'distance' refers to direct spatial distance or distance of line of sight. Specifically, an RSSI level generated by a lighting fixture has a substantially inverse relationship with a distance between the lighting fixture producing the RSSI level and a detection location where the RSSI level is detected, which makes it possible to determine relative spatial arrangement of the lighting fixtures. Moreover, a signal received from the lighting fixture may include a unique identifier of the same, which makes it easily possible to discriminate between different lighting fixtures. The RSSI levels are used together with distances between individual physical locations and a number of detection locations to commission a lighting system, that is, to identify a mapping between a plurality of lighting fixtures and a plurality of physical locations having the lighting fixtures installed therein.

Figure 1:
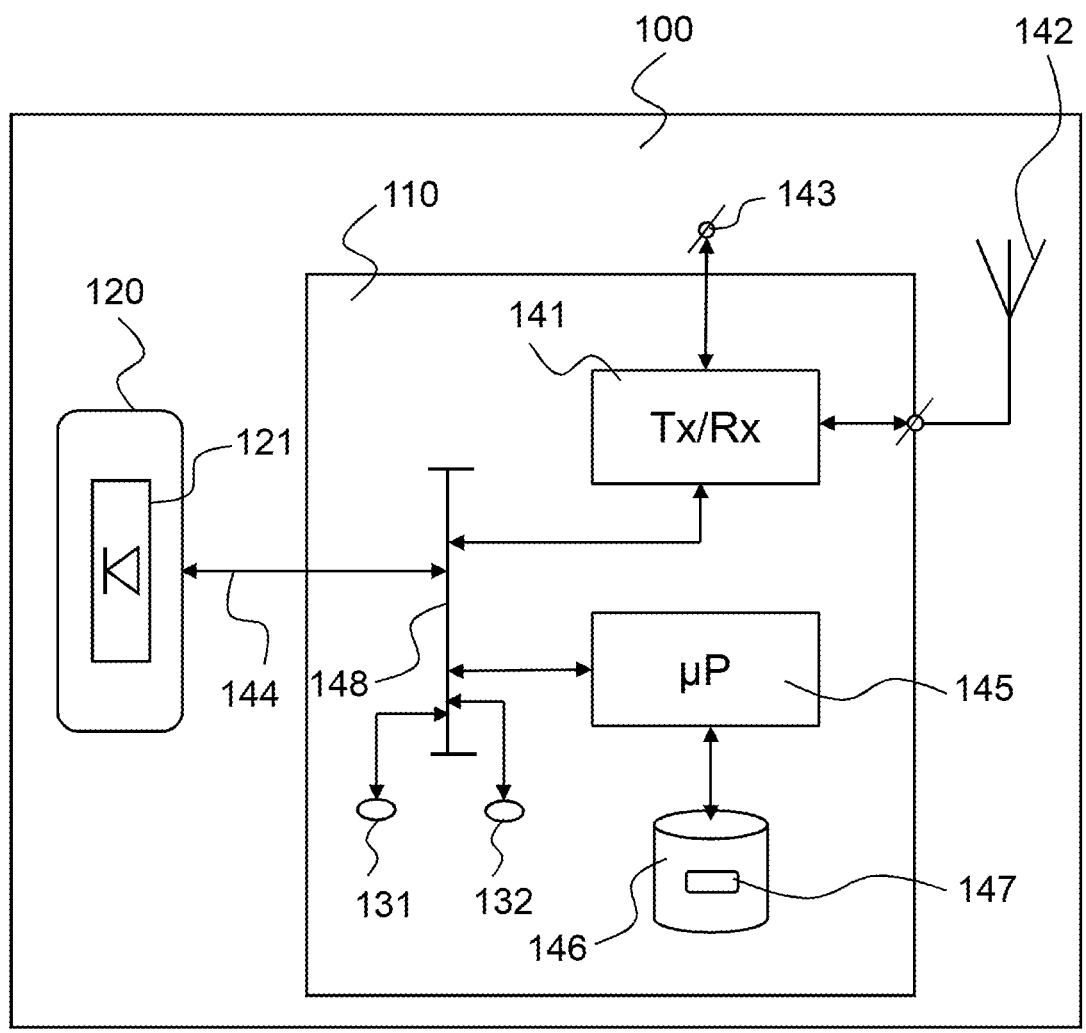
FIG. 1 schematically, a circuit diagram of an embodiment of one of a plurality of lighting fixtures to be commissioned in accordance with the present disclosure.

FIG. 1 illustrates, schematically, a circuit diagram of an embodiment of one of a plurality of lighting fixtures 100 to be commissioned in accordance with the present disclosure. The lighting fixture 100 comprises a control part or control or node device 110 and a lighting device 120. The control device 110 comprises a transceiver, Tx/Rx, module 141 arranged for wireless 142 or wired 143 exchange of messages or data packets with a network gateway and/or other node devices. The transmission part of the transceiver may be used for generating RF signals which may be detected by other lighting fixtures or by a separate detecting device. The control device 110 further comprises at least one data processor or controller 145, and at least one data repository or storage or memory 146 for storing computer program code instructions.

A unique identifier, ID, or unique address information 147 of the lighting fixture in a network, such as its Media Access Control, MAC, address, may be stored in the repository 146, or a separate memory or storage accessible to the at least one processor or controller 145. The at least one processor or controller 145 communicatively interacts with and controls the transceiver 141 and the at least one repository or storage 146 via an internal data communication bus 148 of the control device 110. The unique address information may also be a physical identifier located on the lighting device 120.

The control device 110 may be part of or operatively connect 144 to the lighting device 120, comprising a lighting module 121, preferably a LED lighting module, operation of which may be controlled by the control device 110 from or through a network gateway, or by a remote control device, for example.

The lighting fixture 100 may further comprise at least one sensor, for sensing an output signal of a lighting fixture 100, such as an RF sensor 131 and/or an optical sensor 132. An RF and/or light or another output signal generated by a lighting fixture 100 is received by the sensors 131 and/or 132 of other lighting fixtures or separate positioned sensors 131 and/or 132, such that distances between the lighting fixtures may be determined, which in turn will be used to determine a relative spatial arrangement of the lighting fixtures. The sensors 131, 132 or other signal receiving devices are arranged for obtaining signal strength of RF or light or other types of output signals generated by a lighting fixture.

The lighting fixtures, being enabled with connectivity features, allow for control and interaction among the lighting fixtures and/or with a mobile device or digital controller independent of the lighting fixtures. Specifically, RF signals from the lighting fixtures may be detected by a mobile device and/or by other similar lighting fixtures.

In the method of commissioning a lighting system in accordance with the present disclosure, each of the plurality of lighting fixtures to be commissioned produces an RF output signal, and RSSI levels of RF output signals produced by the lighting fixtures are obtained at a plurality of detection locations by at least one detecting device. The number of the detection locations is smaller than the number of the physical locations of the lighting fixtures. The method makes use of a probability-based algorithm to map the lighting fixtures to the physical locations.

Specifically, for each lighting fixture, the method may compute a probability of the lighting fixture being located at a physical location of the plurality of physical locations, based on RSSI levels, corresponding to the lighting fixtures, obtained from each of the detection locations. The method may then identify a physical location with the highest probability having the lighting fixture located therein, for each lighting fixture, based on the probability of the lighting fixture being located at a respective physical location. Alternatively, the method may also identifies, for each of the physical locations, a lighting fixtures possibly located at the physical location using similar steps as described above.

Figure 2:
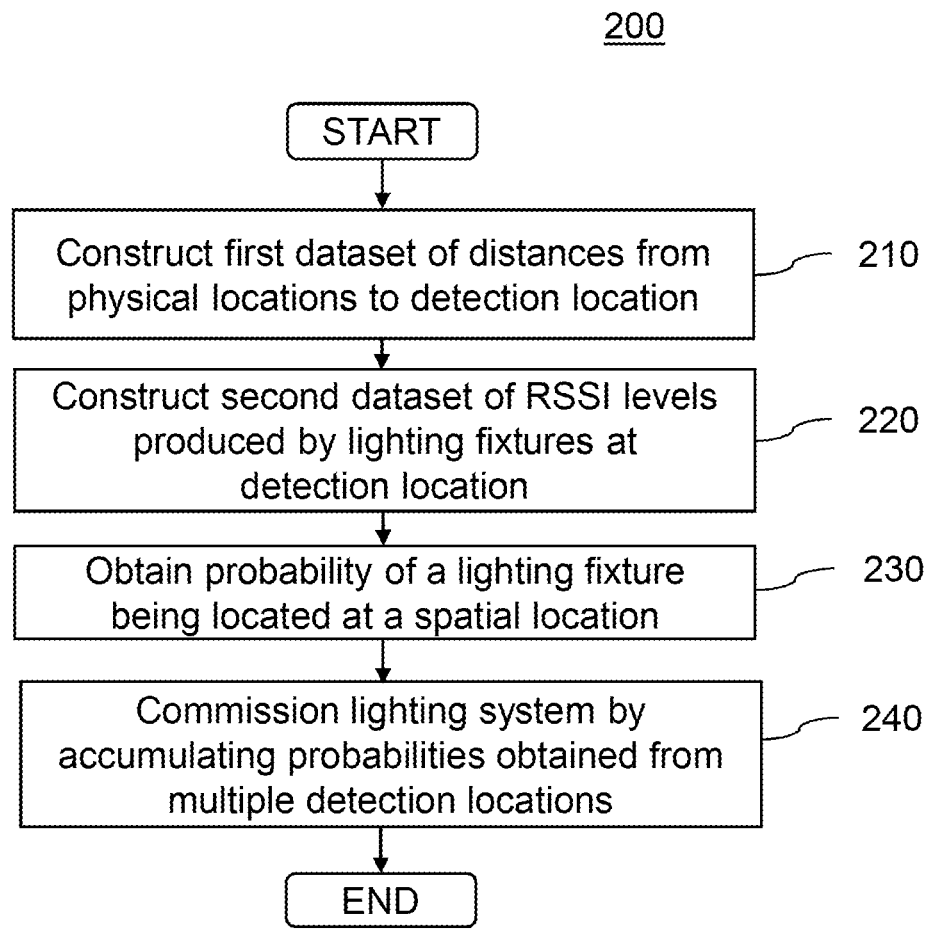
FIG. 2 illustrates, in a flow chart, an example of detailed steps of a method of commissioning a lighting system comprising a plurality of lighting fixtures, in accordance with the present disclosure.

FIG. 2 illustrates, in a flow chart, an example of detailed steps of a method 200 of commissioning a lighting system comprising a plurality of lighting fixtures 100, in accordance with the present disclosure.

Figure 3:
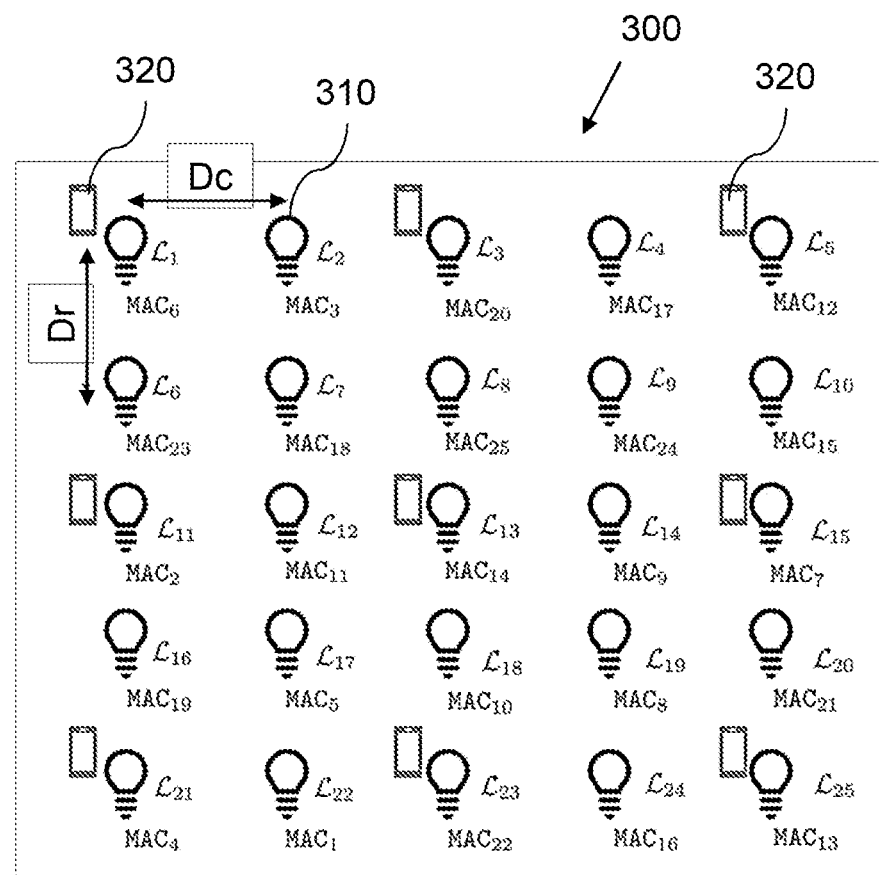
FIG. 3 illustrates an exemplary floor plan having 25 physical locations arranged as a 5-by-5 grid, in accordance with the present disclosure.

The method 200 of commissioning the lighting system is described herein with reference to an example illustrated in FIG. 3, wherein a mobile detecting device or a plurality of detecting devices 320, such as mobile phones, is used to detect received RSSI signal strength of RF output signals produced by the lighting fixtures designated by $L_i$ and i=1, 2, ..., 25, arranged in accordance with a rectangular grid at a plane 300, such as the ceiling of a building. It will be appreciated that RF sensors 147 or transceivers 141 of the lighting fixtures may be used to obtain the RSSI signal strengths as well. Each lighting fixture is identified by a unique identifier 147, in this example its MAC address, indicated as $MAC_{1-25}$.

The mutual distance between the physical locations 310 of the lighting fixtures and between detection locations and the physical locations in one direction of the plane 300 is indicated by Dr and in another direction by Dc, respectively. The distances may be the same or different, for example a few meters, such as 2-5 meters, for example.

In an embodiment of the present disclosure, to commission the lighting system with a plurality of lighting fixtures, a mobile detecting device 320 is placed at a number of detection locations at a distance beneath the plane 300 at which the lighting fixtures are installed. The mobile detecting device(s) 320 may be placed below a selected number of lighting fixtures, with the number of detection locations, which are selected for receiving RF output signals produced by said lighting fixtures, being smaller than the number of physical locations to be correlated to the lighting fixtures. The detection locations are selected such that the physical locations of the lighting fixtures are substantially covered by the detection locations, which allows sufficiently accurate commissioning information to be obtained. Less detection locations also mean significant reduction in both the legwork and processing load.

In accordance with the present disclosure, the mobile detecting device(s) 320 may detect RSSI levels of RF signals output by the lighting fixtures. In an embodiment, RSSI levels from each of the lighting fixtures may be collected over a period of time and averaged. This helps to obtain more accurate RSSI levels which allows the relative arrangement between the lighting fixtures to be more precisely determined.

An exemplary floor plan as shown in FIG. 3 contains twenty five physical locations arranged as a 5-by-5 grid, each physical location 310 has one lighting fixture installed thereto. Detection is conducted at nine detection locations as illustrated in FIG. 3 by the position of the detection device (s). The selection of just nine detection locations is found, in this example, sufficient for ensuring accurate commissioning, as all the physical locations are essentially covered by the nine detection locations.

At step 210, distances between each of the physical locations and the first detection location (the one at the upper left corner) are obtained, and a first dataset is constructed from the obtained distances. In one embodiment, the first dataset may be a distance vector.

At step 220, RSSI levels from all of the lighting fixtures are detected at the first detection location, and a second dataset is constructed from the detected RSSI levels. In one embodiment, the second dataset is an RSSI level vector.

Next, at step 230, a probability of a lighting fixture being located at a physical location is obtained by applying a probability-based algorithm to the first and second datasets.

The above steps 210 to 230 are repeated for all nine detection locations, which gives probabilities of a lighting fixture being located at a physical location. That is, for each pair of lighting fixture and spatial location, nine probabilities are obtained, showing how likely that the lighting fixture may be located at the spatial locations.

Following that, at step 240, the commissioning of the lighting system is conducted by accumulating the probabilities obtained from all the detection locations. For each lighting fixture, a physical location with the highest probability is identified as having the lighting fixture located therein.

Figure 4:
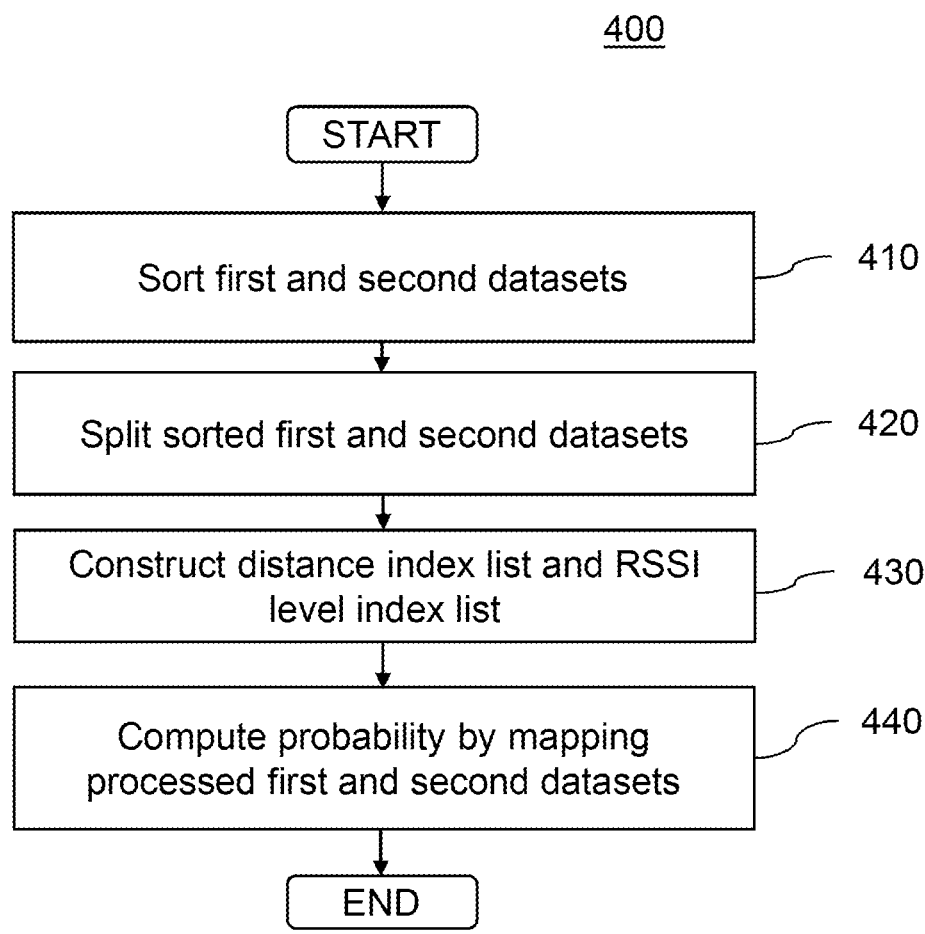
FIG. 4 illustrates, in a flow chart, an example of detailed steps of a method of computing a probability of a lighting fixture being located at a physical location, in accordance with the present disclosure.

FIG. 4 illustrates, in a flow chart, an example of detailed steps of a method 400 of computing a probability of a lighting fixture being located at a physical location, in accordance with the present disclosure.

At step 410 both the first dataset, which is the distance vector, and the second dataset, which is the RSSI level vector, are sorted. It is noted that the distance vector may be obtained before or after the RSSI level vector, as long as both vectors, after being sorted, follow the same fashion or trend such that a proper correspondence between the two vectors is realised. That is, physical locations as indicated by indices corresponding to each element in the sorted distance vector and lighting fixtures as indicated by each RSSI level produced by a corresponding lighting fixture may be matched correctly, which allows probabilities of having a lighting fixture located at a group of physical locations to be calculated subsequently, or vice versa. In an embodiment, considering that a detected RSSI level is higher when a distance between a mobile detecting device and a lighting fixture is smaller or shorter, the RSSI vector is sorted in a descending order, and the distance vector is sorted in an ascending order.

At step 420, the sorted RSSI level vector may be further split into multiple contiguous intervals. As an example, the multiple RSSI level intervals are decided according to RSSI level reference intervals which may be pre-selected based on experience. In another embodiment, the sorted RSSI level vector is split into contiguous intervals as needed.

Figure 5:
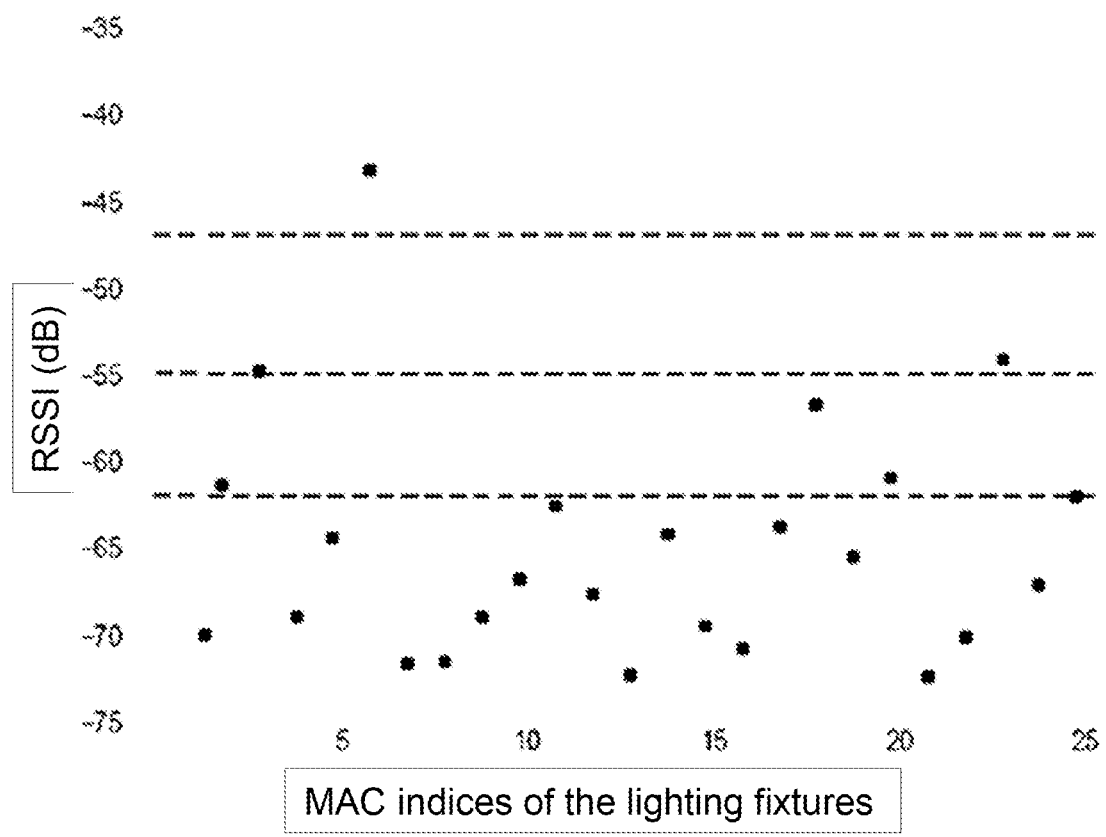
FIG. 5 illustrates an example of RSSI levels of lighting fixtures obtained at a first detection location of FIG. 3.

As an example, FIG. 5 illustrates along the vertical axis values of RSSI signals, measured in dB, obtained from all lighting fixtures, indicated by black dots and identified by their MAC address along the horizontal axis, detected at the first detection location of FIG. 3, i.e. with the detecting device 320 located at the left upper corner of FIG. 3.

The RSSI levels as shown in FIG. 5 are split, for example, into four contiguous intervals of: {[−47, max RSSI], [−55, −47), [−62, −55), [min RSSI, −62)} with max referring to maximum and min referring to minimum.

Mapping between the sorted (and split as needed), RSSI level vector and the sorted (and split as needed) distance vector may be facilitated by constructing an RSSI level index list and distance index list, respectively, at step 430 in FIG. 4. An RSSI level index may be a unique identifier for identifying a lighting fixture which produces the corresponding RSSI level at the detection location, such as the MAC address of the lighting fixture.

In an embodiment, the RSSI level index list may be constructed from the sorted RSSI level vector, which will be used subsequently in mapping the sorted RSSI level vector and a sorted distance vector. In case the RSSI level vector is also split, the RSSI level intervals are considered when constructing the RSSI level index list.

For the example of FIG. 5, the following RSSI level index list is obtained: {[$MAC_6$], [$MAC_3$, $MAC_{23}$], [$MAC_2$, $MAC_{18}$, $MAC_{20}$], [$MAC_{11}$, $MAC_{25}$, . . . ]}

The distance index list may be constructed from the sorted distance vector similarly. In an embodiment, the sorted distance vector may be further split into intervals in the same fashion as that for the RSSI levels. For the example of FIG. 3, the obtained distance index list is, for example, {[$d_1$], [$d_2$, $d_6$], [$d_7$, $d_3$, $d_{11}$], [$d_{12}$, $d_8$, . . . ]}. This distance index list corresponds to a location sequence of lighting fixtures, for example, {[$L_1$], [$L_2$, $L_6$], [$L_{11}$, $L_7$, $L_3$], [$L_{12}$, $L_8$, . . . ], wherein $L_i$ identifies a lighting fixture i.

In another exemplary embodiment, both the distance vector and RSSI level vector are sorted in a way of allowing the distances and RSSI levels to have proper correspondence. That is, higher RSSI levels correspond to shorter distances, for example. For a physical location with a specific distance from the detection location, a tolerance is considered and a subrange of distances is selected from the distance vector. From this distance subrange, an order range of the sorted distance vector is obtained. An RSSI level subrange corresponding to the selected distance subrange is selected, that is, RSSI levels falling into the same order range are selected. Then identifiers of lighting fixtures corresponding to the selected RSSI level range are identified. The method may then calculate probabilities of having the identified lighting fixtures installed at the physical location.

In another embodiment, identification is done from RSSI levels to distances, which identifies a group of physical location possibly having a lighting fixture installed thereto.

Figure 6A:
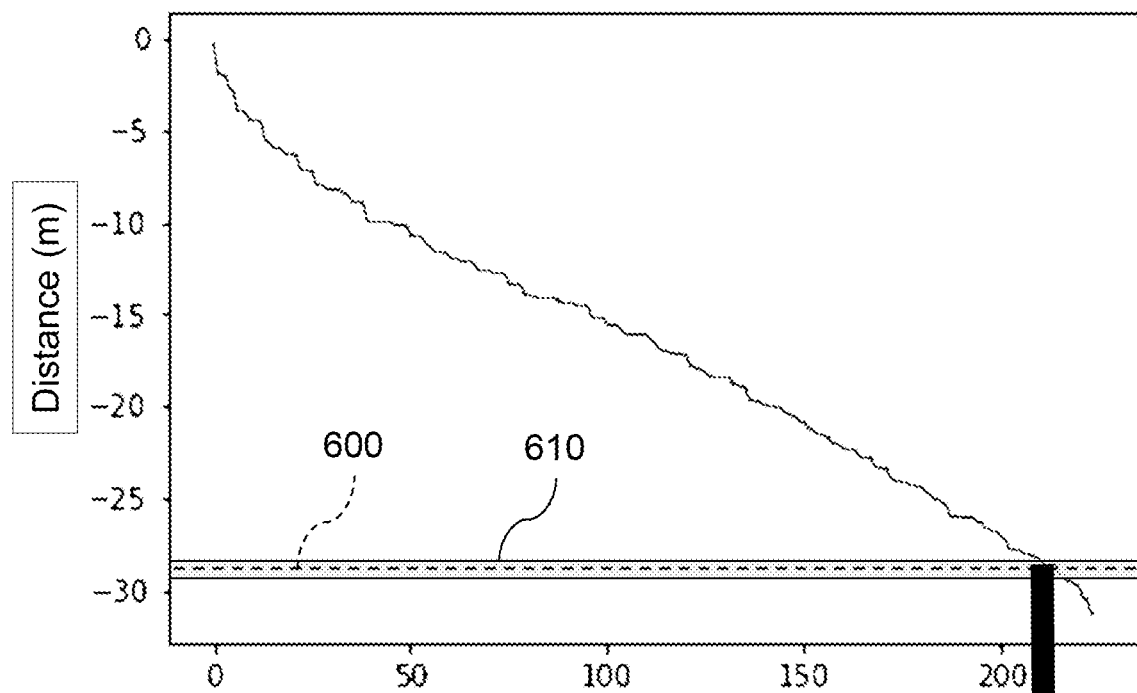
FIG. 6a is a graph illustrating an example of a sorted distance vector, in accordance with the present disclosure.
Figure 6B:
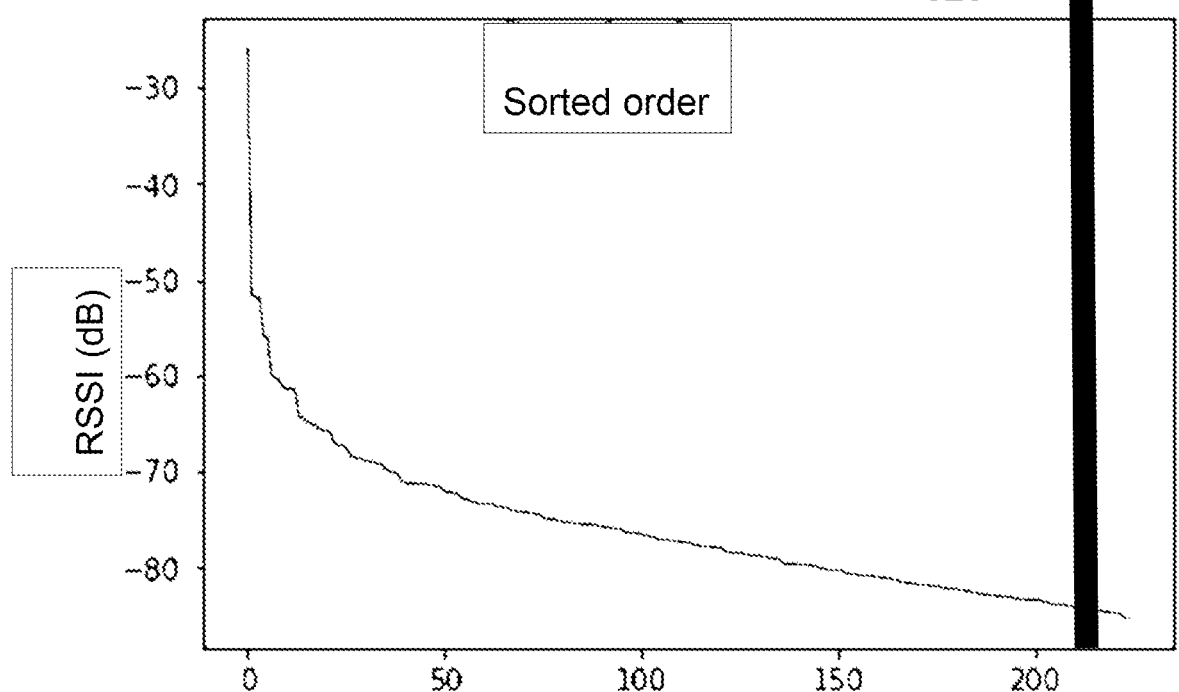
FIG. 6b is a graph illustrating an example of a sorted RSSI level vector, in accordance with the present disclosure.

FIG. 6a is a graph illustrating another example of a sorted distance vector, ordered by increasing absolute distance in m, indicated along the vertical axis, and FIG. 6b is a graph illustrating an example of a sorted RSSI vector, ordered by decreasing RSSI level in dB, indicated along the vertical axis. Both the sorted distance vector and the sorted RSSI level vector show a similar decreasing trend. In this specific example as illustrated in FIGS. 6a and 6b, there are 225 lighting fixtures installed at 15×15 physical locations. Physical location 10, for example, has a distance of −28.6363 m from the detection location, indicated by the dotted line 600 in FIG. 6a. Considering a tolerance, a subrange 610 of [−28.0303, −26.2323] may be selected. From FIG. 6a it is seen that this subrange 610 corresponds to an order range of [207, 216]. Referring to the same order range [207, 216] in FIG. 6b, as indicated by reference numeral 620, lighting fixtures with RSSI levels falling into the order range [207, 216] are identified. The method may then compute the probability of having the identified lighting fixtures installed at physical location 10.

Referring to FIG. 4, at step 440, for each of the lighting fixtures as in the RSSI level vector or RSSI level index list, probabilities of having the lighting fixture installed at a group of physical locations are calculated. In an embodiment, the probabilities may be calculated by running through the RSSI level index list and the distance level index list.

For the example of FIG. 5, with the RSSI level index list and the distance level index list obtained at step 430, a probability of a lighting fixture identified by MACS at location $L_i$ (No. 1 physical location) is 1. A lighting fixture identified by $MAC_3$ can possibly be located at location $L_2$ and $L_3$, each with a probability of ½. Probabilities for lighting fixture $MAC_{23}$ are the same as for $MAC_3$. For $MAC_2$, it can possibly be located at three locations $L_{11}$, $L_7$ and $L_3$, each with a probability of ⅓.

The above steps are repeated for each of the detection locations. After that, the probabilities of a lighting fixture being located as a group of physical locations are accumulated. A physical location with the highest probability is decided as having the lighting fixture installed thereto.

In the above example, the lighting fixtures and the physical locations may be exchanged. That is, in another embodiment, the method may also determine a group of lighting fixtures each having a probability of being located at a physical location, and then determine the mapping between the lighting fixtures and the physical locations by accumulating the probabilities obtained at each detection location.

The above method for commissioning a lighting system comprising multiple lighting fixtures according to the present disclosure uses less detection locations than the number of physical locations, for example half (½) the number of physical locations of lighting fixtures, or even one-tenth (1/10) or one-twentieth (1/20) of the number of the physical locations in case of hundreds of lighting fixtures. In this sense, the commissioning is performed without traversing all the physical locations, which results in a significant reduction in both work load for a system engineer conducting the commissioning of the lighting system and processing load needed for the commissioning.

The above method may also be used to validate an existing commissioning information previously obtained via a different commissioning method, and thereby, improve the accuracy of the overall commissioning process, and/or for commissioning an upgraded system, i.e. extended by more lighting fixtures or wherein lighting fixtures are replaced by others, for example.

Figure 7:
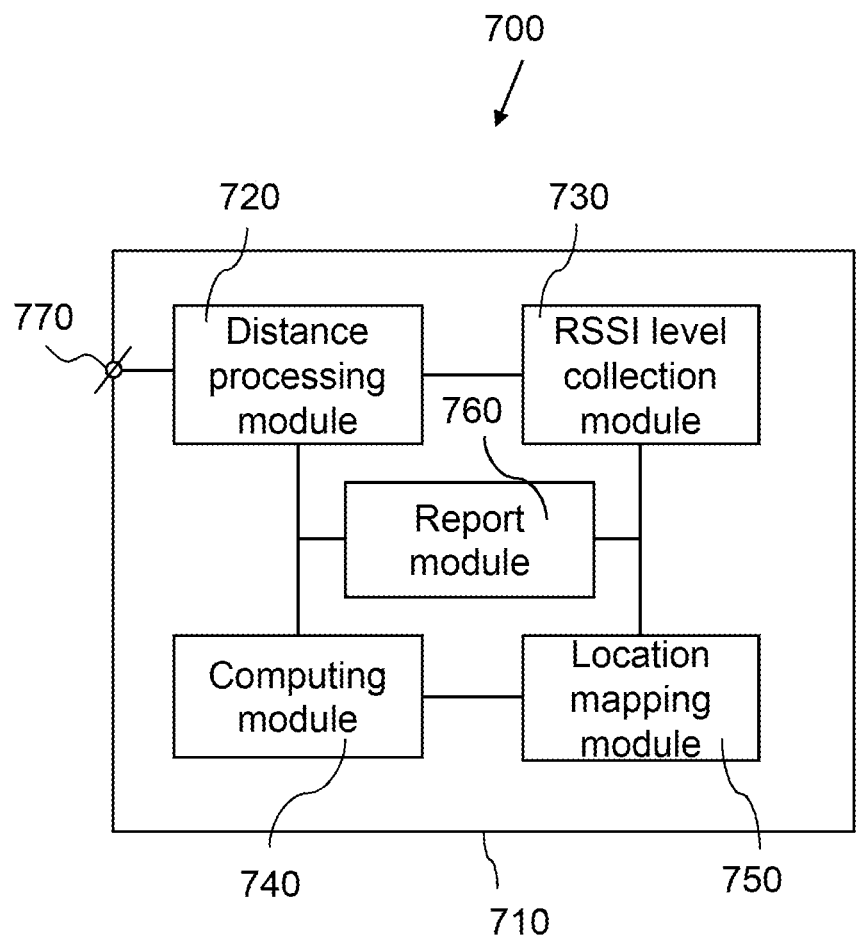
FIG. 7 illustrates, schematically, an example of a device for commissioning a lighting system comprising a plurality of lighting fixtures, in accordance with the present disclosure.

In accordance with the present disclosure, and with reference to FIG. 7, an embodiment of the disclosure provides a device 700 for commissioning a lighting system comprising a plurality of lighting fixtures positioned at a plurality of physical locations, and each lighting fixture having at least one signal generating device for generating an RF output signal comprising a unique identifier identifying the lighting fixture. The device 700 comprises a processing device 710 having a distance processing module 720, an RSSI level collecting module 730, a computing module 740 and a location mapping module 750.

The distance processing module 720 is arranged for constructing a first dataset comprising distances to the physical locations from a selected detection location or locations for measuring RSSI levels of signals produced by the lighting fixtures, such as in the vicinity of or at physical locations of the lighting fixtures.

The RSSI level collecting module 730 is arranged for constructing a second dataset comprising RSSI levels of RF output signals produced by the lighting fixtures, identified by their unique identifiers, and obtained by a detecting device at the detection location, The computing module 740 is arranged for obtaining a probability of a lighting fixture being located at a physical location by applying a probability-based algorithm to the first and second datasets.

The location mapping module 750 is arranged for commissioning the lighting system by accumulating probabilities obtained from a plurality of detection locations, a number of the detection locations being smaller than a number of the physical locations.

In accordance with an embodiment, the RSSI level collecting module 730 may be further arranged for receiving unique identifiers of the lighting fixtures and for averaging RSSI levels collected, for each of the lighting fixtures, over a period of time.

In accordance with an embodiment, the processing device 710 may further comprises a report module 760 arranged for registering a result of commissioning in a storage device. Such result may then be used by a control system in performing advanced lighting control.

In accordance with an embodiment, the distance processing module 720 may comprise an interface 770 for inputting at least one of detection or detector locations and physical locations, either manually or electronically obtained from a floor plan, architectural drawings, or a distance measurement device, and the like.

In accordance with the present disclosure, another embodiment of the present disclosure provides a computer program product comprising program code means stored on a computer readable medium, the program code means arranged to perform the above commissioning method, when the program code is executed by at least one computer.

It is noted that the above devices may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the devices, the commissioning and/or control device, a luminaire device, a lighting system, the method, and the computer program product of the above aspects may have similar and/or identical preferred embodiments, in particular, as defined in the dependent claims.

It shall be understood that a preferred embodiment of the present disclosure can also be any combination of the dependent claims or above embodiments with the respective independent claim.

The invention claimed is:

1. A method of commissioning a lighting system comprising a plurality of lighting fixtures positioned at a plurality of physical locations, each lighting fixture having at least one signal generating device for generating a Radio Frequency RF output signal comprising a unique identifier identifying said lighting fixture, the method performed by a processing device and comprising steps of:
constructing a first dataset comprising distances to said physical locations from a detection location selected for receiving RF output signals produced by said plurality of lighting fixtures;
constructing a second dataset comprising Received Signal Strength Indicator (RSSI) levels of RF output signals produced by said plurality of lighting fixtures, each lighting fixture respectively identified by said unique identifiers, and obtained by a detecting device at said detection location;
obtaining a probability of a respective lighting fixture being located at a respective physical location by applying a probability-based algorithm to said first and second datasets, wherein applying said probability-based algorithm comprises the steps of:
sorting said first dataset in one of ascending and descending order and sorting said second dataset in the other of ascending and descending order;
splitting said sorted first dataset and said sorted second dataset into respective contiguous intervals;
providing a split first dataset and a split second dataset;

computing said probability by mapping said split first dataset and said split second dataset for respective ones of said intervals; and commissioning said lighting system by accumulating probabilities obtained from a plurality of detection locations, a number of said plurality of detection locations being smaller than a number of said plurality of physical locations;

wherein said detection location is a location where a mobile detecting device locates or a location where one of said plurality of lighting fixtures locates.

2. The method according to claim 1, wherein said first dataset is constructed from one of a floor plan designating said physical locations of said lighting fixtures and distance measurements.

3. The method according to claim 1, wherein said second dataset is constructed by averaging RSSI levels received over a period of time.

4. A computer program product comprising program code means stored on a non-transitory computer readable medium, said program code means arranged for performing said method according to claim 1, when said program code is executed by at least one computer.

5. A method of commissioning a lighting system comprising a plurality of lighting fixtures positioned at a plurality of physical locations, each lighting fixture having at least one signal generating device for generating a Radio Frequency (RF) output signal comprising a unique identifier identifying said lighting fixture, the method performed by a processing device and comprising steps of:

constructing a first dataset comprising distances to said physical locations from a detection location selected for receiving RF output signals produced by said plurality of lighting fixtures;

constructing a second dataset comprising Received Signal Strength Indicator (RSSI) levels of RF output signals produced by said plurality of lighting fixtures, each lighting fixture respectively identified by said unique identifiers, and obtained by a detecting device at said detection location;

obtaining a probability of a respective lighting fixture being located at a respective physical location by applying a probability-based algorithm to said first and second datasets; and commissioning said lighting system by accumulating probabilities obtained from a plurality of detection locations, a number of said plurality of detection locations being smaller than a number of said plurality of physical locations;

wherein said detection location is a location where a mobile detecting device locates or a location where one of said plurality of lighting fixtures locates;

wherein applying said probability-based algorithm comprises the steps of:

sorting said first dataset in one of ascending and descending order and sorting said second dataset in the other of ascending and descending order; and computing said probability by mapping said sorted first dataset and said sorted second dataset; and constructing a distance index list from said sorted first dataset and an RSSI level index list from said sorted second dataset, wherein each element of said distance index list corresponds to the respective physical location indicated by a distance between said respective physical location and said detection location, and each element of said RSSI level index list corresponds to a unique identifier of the respective lighting fixture, and wherein said step of computing said probability comprises mapping said distance index list and said RSSI level index list.

6. The method according to claim 5, wherein said first dataset is constructed from one of a floor plan designating said physical locations of said lighting fixtures and distance measurements.

7. The method according to claim 5, wherein said second dataset is constructed by averaging RSSI levels received over a period of time.

8. The method according to claim 5, wherein said probability-based algorithm is applied to part of said first dataset having distances above a first threshold value and part of said second dataset having RSSI levels above a second threshold value.

9. A method of commissioning a lighting system comprising a plurality of lighting fixtures positioned at a plurality of physical locations, each lighting fixture having at least one signal generating device for generating a Radio Frequency (RF) output signal comprising a unique identifier identifying said lighting fixture, the method performed by a processing device and comprising steps of:

constructing a first dataset comprising distances to said physical locations from a detection location selected for receiving RF output signals produced by said plurality of lighting fixtures;

constructing a second dataset comprising Received Signal Strength Indicator (RSSI) levels of RF output signals produced by said plurality of lighting fixtures, each lighting fixture respectively identified by said unique identifiers, and obtained by a detecting device at said detection location;

obtaining a probability of a respective lighting fixture being located at a respective physical location by applying a probability-based algorithm to said first and second datasets; and commissioning said lighting system by accumulating probabilities obtained from a plurality of detection locations, a number of said plurality of detection locations being smaller than a number of said plurality of physical locations;

wherein said detection location is a location where a mobile detecting device locates or a location where one of said plurality of lighting fixtures locates;

wherein applying said probability-based algorithm comprises the steps of:

sorting said first dataset in one of ascending and descending order and sorting said second dataset in the other of ascending and descending order; and computing said probability by mapping said sorted first dataset and said sorted second dataset;

wherein said step of computing said probability comprises the steps of:

obtaining, for each respective physical location, a first subrange of said sorted first dataset;

obtaining, for said first subrange, from said sorted second dataset a second subrange of RSSI levels; and computing said probability for lighting fixtures corresponding to said second subrange based on RSSI levels.

10. The method according to claim 9, wherein said first dataset is constructed from one of a floor plan designating said physical locations of said lighting fixtures and distance measurements.

11. The method according to claim 9, wherein said second dataset is constructed by averaging RSSI levels received over a period of time.

12. The method according to claim 9, wherein said probability-based algorithm is applied to part of said first dataset having distances above a first threshold value and part of said second dataset having RSSI levels above a second threshold value.

13. A method of commissioning a lighting system comprising a plurality of lighting fixtures positioned at a plurality of physical locations, each lighting fixture having at least one signal generating device for generating a Radio Frequency (RF) output signal comprising a unique identifier identifying said lighting fixture, the method performed by a processing device and comprising steps of:
constructing a first dataset comprising distances to said physical locations from a detection location selected for receiving RF output signals produced by said plurality of lighting fixtures;
constructing a second dataset comprising Received Signal Strength Indicator (RSSI) levels of RF output signals produced by said plurality of lighting fixtures, each lighting fixture respectively identified by said unique identifiers, and obtained by a detecting device at said detection location;
obtaining a probability of a respective lighting fixture being located at a respective physical location by applying a probability-based algorithm to said first and second datasets; and
commissioning said lighting system by accumulating probabilities obtained from a plurality of detection locations, a number of said plurality of detection locations being smaller than a number of said plurality of physical locations;
wherein said detection location is a location where a mobile detecting device locates or a location where one of said plurality of lighting fixtures locates;
wherein applying said probability-based algorithm comprises the steps of:
sorting said first dataset in one of ascending and descending order and sorting said second dataset in the other of ascending and descending order; and
computing said probability by mapping said sorted first dataset and said sorted second dataset; and
wherein said step of computing said probability comprises the steps of:
obtaining, for each respective lighting fixture, a first subrange of said sorted second dataset;
obtaining, for said first subrange, from said sorted first dataset a second subrange of distances; and
computing said probability for each respective physical location corresponding to said second subrange based on distances.

14. The method according to claim 13, wherein said first dataset is constructed from one of a floor plan designating said physical locations of said lighting fixtures and distance measurements.

15. The method according to claim 13, wherein said second dataset is constructed by averaging RSSI levels received over a period of time.

16. The method according to claim 13, wherein said probability-based algorithm is applied to part of said first dataset having distances above a first threshold value and part of said second dataset having RSSI levels above a second threshold value.

* * * * *